United States Patent [19]

Breiter

[11] 4,053,689
[45] Oct. 11, 1977

[54] CONTACT BETWEEN METAL CAN AND CARBON/GRAPHITE FIBERS IN SODIUM/SULFUR CELLS

[75] Inventor: Manfred Wolfgang Breiter, Niskayuna, N.Y.

[73] Assignee: Electric Power Research Institute, Inc., Palo Alto, Calif.

[21] Appl. No.: 752,489

[22] Filed: Dec. 20, 1976

[51] Int. Cl.² ............................................. H01M 2/30
[52] U.S. Cl. .................................... 429/102; 429/122; 429/211; 429/235; 429/245
[58] Field of Search ................ 429/122, 211, 235, 245, 429/102, 103, 104, 101

[56] References Cited

U.S. PATENT DOCUMENTS

| | | |
|---|---|---|
| 3,852,113 | 12/1974 | Yokota et al. ........................ 429/122 |
| 3,883,367 | 5/1975 | Chiku et al. ......................... 429/104 |
| 4,011,367 | 3/1977 | Evans et al. ......................... 429/104 |

Primary Examiner—Anthony Skapars
Attorney, Agent, or Firm—Townsend and Townsend

[57] ABSTRACT

In sodium/sulfur batteries, electrical contact is maintained between the sulfur which is nonconductive and an aluminum container or other external electrical conductor, by having electrical contact between the sulfur and conductive carbon fibers and/or mat which contact a molybdenum or chromium coated surface of an aluminum conductor. A terminal portion of the aluminum conductor is uncoated and is employed for making electrical contact to the external conductor. A battery configuration of particular interest has a central β-alumina tube which may serve as the sulfur or sodium container surrounded by sodium or sulfur respectively.

10 Claims, 5 Drawing Figures

CONTACT BETWEEN METAL CAN AND CARBON/GRAPHITE FIBERS IN SODIUM/SULFUR CELLS

This invention was made under contract with or supported by the Electric Power Research Institute.

BACKGROUND OF THE INVENTION

FIELD OF THE INVENTION

In attempting to develop new technologies for economical storage of energy, the sodium/sulfur battery offers many advantages. The sodium/sulfur battery is rechargeable, has large storage capacity, and employs relatively inexpensive materials of low atomic weight, so that the storage capacity per unit weight is greater than heavier elements, such as lead.

While the sodium/sulfur battery offers many advantages, it also creates many new problems in developing an operable storage battery capable of numerous rechargings and dischargings at high efficiency. While aluminum, for many reasons, is a desirable container for the sulfur, aluminum forms sulfide layers with poor conductivity when exposed to sulfur/polysulfide melts. Since sulfur is nonconductive, electrical contact with the sulfur is achieved by using conductive carbon or graphite as mats and/or fibers. The conductive carbon or graphite fibrous material is substantially uniformly dispersed through the sulfur. Means must therefore be provided for allowing for efficient low resistance transmission of electricity from sulfur through the fibrous carbon and/or graphite to the aluminum container or other external electrical conductor. The means which provide the electrical transmission must not be subject to the formation of nonconductive or poorly conductive layers or contacts and must permit a mechanically and chemically stable contact.

SUMMARY OF THE INVENTION

A stable low resistive conductor for transmitting electricity between a sulfur/polysulfide melt and an aluminum container is provided, which comprises fibrous conductive carbon and/or graphite relatively uniformly dispersed through the sulfur, a portion of which is in contact with a molybdenum or chromium surface of a coated aluminum conductor, an uncoated portion of which is in electrical contact with an external electrical conductor e.g. a clean surface of the aluminum container. Where the sulfur is contained in a $\beta$-alumina tube, the aluminum conductor will be connected through the cap e.g. a metal cap or a ceramic cap with a wire through it.

DESCRIPTION OF SPECIFIC EMBODIMENTS

Figure 1:
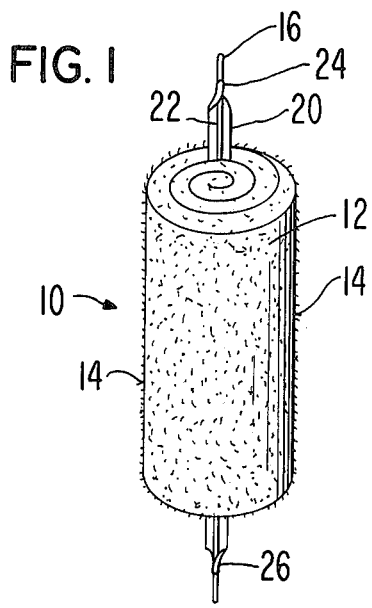
FIG. 1 is a perspective view of a conductive aluminum wire and foil wrapped in a carbon mat.

In accordance with the subject invention, conductors are provided for transmitting electricity to and from sulfur/polysulfide melts to an external electrical conductor. The method generically provides having fibrous carbon or graphite substantially uniformly distibuted as a mat and/or fibers, in the sulfur in electrical contact with a coated aluminum foil, with the fibrous material contacting the coating which is molybdenum or chromium. An uncoated portion of the aluminum provides electrical contact with an uncoated portion of the aluminum container or an electrically conducting portion of a cap, conveniently by welding or soldering.

A number of different approaches may be employed to achieve the desired electrical transmission from the sulfur to the external electrical conductor. In a first approach, a woven graphite cloth is wrapped around an aluminum wire of substantially the length of the sulfur can. An aluminum foil, conveniently of about 30 mil thickness, is plasma sprayed on one side with either molybdenum or chromium. An upper and lower edge of the foil is kept free of the coating. A strip is cut from the foil of substantially narrower width than the circumference of the cylinder formed by the graphite cloth. A strip of coated aluminum foil is wrapped around the aluminum wire at the ends of the foil and pressed against the graphite cloth mechanically. The molybdenum or chromium coating touches the graphite cloth. The foil is spot welded to the aluminum wire in the areas free of the coating. Desirably, carbon fibers e.g. MAT32 are rolled into the woven graphite cloth.

Depending upon the configuration of the battery, the position of the wire and foil and the manner of forming the cylinder will vary. In some instances, the wire and foil may be co-axial, while in other instances it will be necessary to have the wire and foil eccentric, with the wire and foil substantially removed from the axis of the cylinder. Where the wire and foil is axial, the mat is merely rolled about the wire and foil, so as to have a cylinder with the wire substantially defining the axis of the cylinder. However, as will be discussed subsequently, in some battery configurations, it will be necessay to introduce a central well. In these configurations, the wire and foil are removed from the axis. Conveniently, the mat is rolled from the end opposite the end to which the wire and foil are pressed and a second mat is employed to cover the wire and foil, the second mat being rolled about the first mat to expand the cylinder.

The rolled up piece is then compressed by a flexible stainless steel foil. Where the wire is co-axial, the conductor will normally be employed in a channel, having been pressed into shape to fit the channel, which may be cylindrical, or oval. A battery configuration which would allow this type of conductor is depicted in copending application Ser. No. 731,170 filed Oct. 12, 1976. The appropriate portions of that application are incorporated herein by reference, particularly the description of the $\beta$-alumina electrolyte block.

With the wire off center, the conductor may be used in the same manner as described above or may be used in those situations where the $\beta$-alumina electrolyte is formed as a tube. The conducting cylinder is then inserted into a polymer mold, conveniently Telfon ®. Sulfur is introduced so as to completely fill all the spaces in the mold and form a sulfur-carbon fiber plug. The sulfur-carbon plug is then machined so as to provide a well for receiving the tubular $\beta$-alumina. This type of configuration is described in detail in co-pending application Ser. No. 714,064 filed Aug. 13, 1976. The description of the battery and the manner of forming the plug is incorporated herein by reference.

The plug is then inserted into an aluminum can. After flattening the aluminum wire protruding from the plug, the flattened portion is spot-welded to the inner wall of the aluminum can.

Alternatively, the sulfur plug may be shaped to fit the β-alumina tube and the sodium surrounds the tube. With this configuration the uncoated aluminum foil can be conveniently connected to the cap enclosing the tube. Where the cap is metal, the aluminum foil can be welded to a cleaned surface of the cap. Where the cap is ceramic, a wire can be introduced through the cap to which the aluminum foil is welded.

An alternative approach is to provide two strips of aluminum foil coated on one surface as described above. The dimensions of the strips and of the components are merely provided as illustrative. The strips are conveniently of about ½ inch width. A layer of carbon fibers, e.g. MAT32, about ⅜ inch thick, 2.5 inches wide and 6 inches long is put between the two strips at one of its ends. The coating touches the fibers. The strips are spot welded together in the areas free of the coating. Additional carbon fibers are rolled up with the layer of carbon fibers, protruding from the spot welded strips.

Depending upon whether the aluminum foil is to be centrally located or off-center, the mat may be rolled in alternative ways as described previously. Where the mat is rolled so as to have the aluminum foil exposed, a second mat will be employed, with carbon fibers rolled up within the mat. Thus, the outer surface will only be the carbon, with only a portion of the aluminum foil exposed at both ends of the cylinder formed by the carbon mats.

After compressing the rolled up material, the resulting cylinder is put into a mold and a sulfur-carbon plug produced by introducing molten surfur into the mold. The plug is machined to the desired dimensions and is then inserted into the aluminum can. The protruding end of the aluminum strip is spot-welded to the interior wall of the can.

For further understanding of this invention, the drawings will now be considered. In FIG. 1 is depicted a completed conductor, with the wire and foil offset from the center. The conductor 10 has a rolled carbon mat 12, which may consist of one or more pieces of mat into which are impregnated carbon fibers 14. Extending through and out of the carbon mat 12 is aluminum wire 16. Extending through the carbon mat and out of the ends of the mat is aluminum foil 20 having a coating of chromium or molybdenum 22 on a surface facing the carbon mat and in contact with the carbon mat. The ends 24 and 26 of the aluminum foil are twisted about the aluminum wire 16. A band at each end of the aluminum foil is free of the coating and makes contact with the aluminum wire 16.

Figure 2:
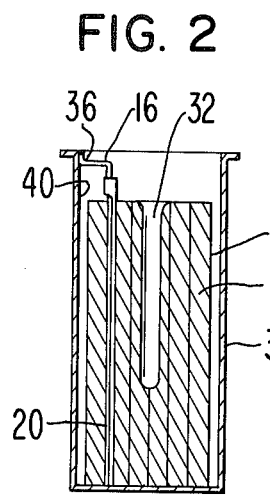
FIG. 2 is a cross-sectional view of a sulfur plug in a container.

Turning now to FIG. 2, the conductor 10 is impregnated with sulfur to provide sulfur-carbon plug 30. The plug has been machined to have well 32 for receiving the β-alumina tube. The sulfur-carbon plug 30 is introduced into aluminum can 34. The exposed end of the wire 16 is flattened at its terminal portion 36 and spot-welded to the inside of the aluminum can 34 wall 40. The aluminum can is now ready for assembling with the β-alumina and sodium cell.

Figure 3:
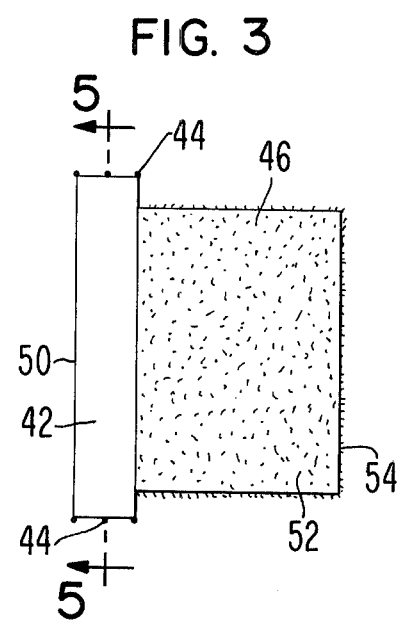
FIG. 3 is a plan view of a carbon mat partially between an aluminum foil envelope.
Figure 4:
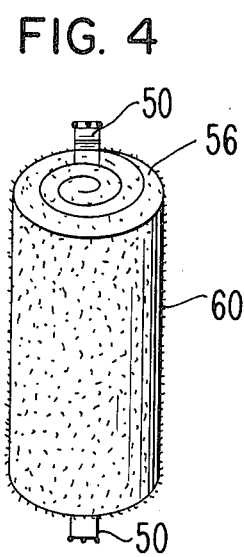
FIG. 4 is a perspective view of a carbon mat cylinder having an aluminum foil conductor.

In FIG. 3 is depicted an alternative embodiment, where 2 strips of internally coated aluminum foil are employed. The 2 strips 42, only 1 of which is visible are spot-welded 44 at various points at their ends. Inserted between the 2 strips is carbon mat 46 which extends out from the aluminum foil envelope 50. Carbon fibers 52 are placed on the mat and the mat is rolled beginning from the end 54 opposite the aluminum envelope 50. By enclosing the cylinder formed by rolling carbon mat 54 with a second mat 56, a cylindrical conductor 60 is obtained with the aluminum foil strips 50 extending from the ends of the cylinder 60.

Figure 5:
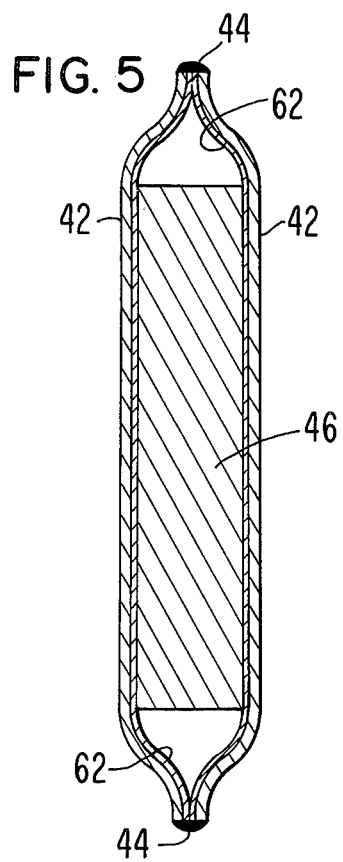
FIG. 5 is a cross-sectional view along line 5—5 of FIG. 3.

In FIG. 5 is depicted a cross-section showing the mat 46 between two sheets of aluminum 42 coated internally with chromium or molybdenum coatings 62. The 2 sheets are spot-welded 44 at their ends, where the aluminum foil 42 is uncoated.

The conductor 60 is treated in substantially the same way as previously described for conductor 10.

While the conductors have been shown as cylindrical, the cross-section can be shaped in any convenient shape, such as oval, rectangular or the like, so as to conform to the geometry of the cell.

By employing the above conductors for providing electrical transmission between the aluminum and the sulfur by means of the carbon fibers and aluminum strips, sodium-sulfur cells can be repeatedly cycled without building up high electrical resistance between the external conductor and the carbon fibers. The conductors of this invention are particularly important in multitube cells. The subject conductors allow for separate current leads from the external conductor to the carbon fibers in the vicinity of each of the tubes allowing for substantially equal current to be drawn through each of the tubes.

Although the foregoing invention has been described in some detail by way of illustration and example for purposes of clarity of understanding, it will be obvious that certain changes and modifications may be practiced within the scope of the appended claims.

I claim:

1. A conductor for transferring electricity to and from sulfur or mixtures of sulfur and sodium polysulfides comprising a mat of conducting carbon or graphite in electrically conducting contact with the chromium or molybdenum surface of a chromium or molybdenum coated aluminum substrate.

2. A conductor according to claim 1, wherein said substrate is an aluminum foil.

3. A conductor according to claim 1, wherein said conductor is a combination of an aluminum foil pressed against an aluminum wire, with the ends of said foil in electrical contact with said wire.

4. A conductor according to claim 1, wherein said mat is in the form of a cylinder and said conductor is co-axial.

5. A conductor according to claim 1, wherein said mat is in the form of a cylinder and said conductor is off-center.

6. A conductor according to claim 5, wherein said mat is impregnated with carbon fibers.

7. A conductor according to claim 6, having a central well extending only a portion of the length of said conductor.

8. A conductor according to claim 1, impregnated with sulfur to form a sulfur-carbon plug.

9. A plug according to claim 8, wherein a portion of said aluminum substrate is free of said coating, and including an aluminum container for said plug, wherein said uncoated portion is in electrical contact with said container.

10. A conductor according to claim 8, wherein said plug is shaped to fit a tube, and a portion of said aluminum substrate is free of said coating, and including an electrically conducting tube cap with said uncoated portion in electrical contact with said tube cap.

* * * * *